United States Patent
Oshida

(10) Patent No.: US 11,858,512 B2
(45) Date of Patent: Jan. 2, 2024

(54) CONTROLLER AND CONTROL METHOD

(71) Applicant: Robert Bosch GmbH, Stuttgart (DE)

(72) Inventor: Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 17/270,143

(22) PCT Filed: Aug. 7, 2019

(86) PCT No.: PCT/IB2019/056706
§ 371 (c)(1),
(2) Date: Feb. 22, 2021

(87) PCT Pub. No.: WO2020/039289
PCT Pub. Date: Feb. 27, 2020

(65) Prior Publication Data
US 2021/0237729 A1    Aug. 5, 2021

(30) Foreign Application Priority Data
Aug. 21, 2018    (JP) ................................ 2018-154383

(51) Int. Cl.
*B60W 30/16* (2020.01)
*B60W 10/04* (2006.01)
*B60W 10/18* (2012.01)

(52) U.S. Cl.
CPC ............ *B60W 30/16* (2013.01); *B60W 10/04* (2013.01); *B60W 10/18* (2013.01); *B60W 2300/36* (2013.01); *B60W 2510/1005* (2013.01)

(58) Field of Classification Search
CPC . B60K 2310/246; B60K 28/10; B60W 10/04; B60W 10/18; B60W 2300/36;
(Continued)

(56) References Cited

U.S. PATENT DOCUMENTS

| 10,882,523 | B2* | 1/2021 | Knitt | B60W 50/085 |
| 2010/0250088 | A1* | 9/2010 | Grolle | B60W 30/16 |
| | | | | 701/96 |

(Continued)

FOREIGN PATENT DOCUMENTS

| JP | 4186376 B2 | 11/2008 |
| JP | 2009116882 A | 5/2009 |

(Continued)

OTHER PUBLICATIONS

International Search Report and Written Opinion for Application No. PCT/IB2019/056706 dated Mar. 9, 2020 (8 pages).

*Primary Examiner* — Babar Sarwar
(74) *Attorney, Agent, or Firm* — Michael Best & Friedrich LLP

(57) ABSTRACT

The present invention obtains a controller and a control method capable of securing a driver's comfort during adaptive cruise control for a straddle-type vehicle.
In the controller and the control method according to the present invention, during the adaptive cruise control in which the straddle-type vehicle is made to travel according to a distance from the straddle-type vehicle to a preceding vehicle, motion of the straddle-type vehicle, and a driver's instruction, when a state where a braking force is generated on at least one of wheels of the straddle-type vehicle is switched to a state where a drive wheel is driven using drive power output from a drive source of the straddle-type vehicle, the braking force generated on the at least one of the wheels is controlled such that a reference braking force is generated on the drive wheel at a time point at which the drive wheel starts being driven due to transmission of the drive power output from the drive source to the drive wheel.

8 Claims, 4 Drawing Sheets

(58) Field of Classification Search
CPC ......... B60W 2510/1005; B60W 30/14; B60W 30/16; B60W 30/165; F16D 48/06
See application file for complete search history.

(56) References Cited

U.S. PATENT DOCUMENTS

| | | | | |
|---|---|---|---|---|
| 2012/0205968 | A1* | 8/2012 | Takenouchi | B60T 8/261 303/9.64 |
| 2013/0204472 | A1* | 8/2013 | Pfefferl | B60W 20/00 701/22 |
| 2016/0144721 | A1* | 5/2016 | Soo | B60L 7/26 180/65.25 |
| 2017/0349185 | A1* | 12/2017 | McNew | B60W 30/16 |
| 2019/0248367 | A1* | 8/2019 | Knitt | B60W 50/14 |
| 2019/0315355 | A1* | 10/2019 | Tokimasa | B60W 30/16 |
| 2020/0108830 | A1* | 4/2020 | Grelaud | B60W 10/184 |

FOREIGN PATENT DOCUMENTS

| | | |
|---|---|---|
| JP | 660393 B2 | 3/2011 |
| JP | 2011189891 A | 9/2011 |
| JP | 2010059585 A | 1/2014 |
| JP | 2016034819 A | 3/2016 |
| WO | WO-2017030131 A1 * | 2/2017 ............ B60T 8/1706 |

* cited by examiner

[FIG. 1]
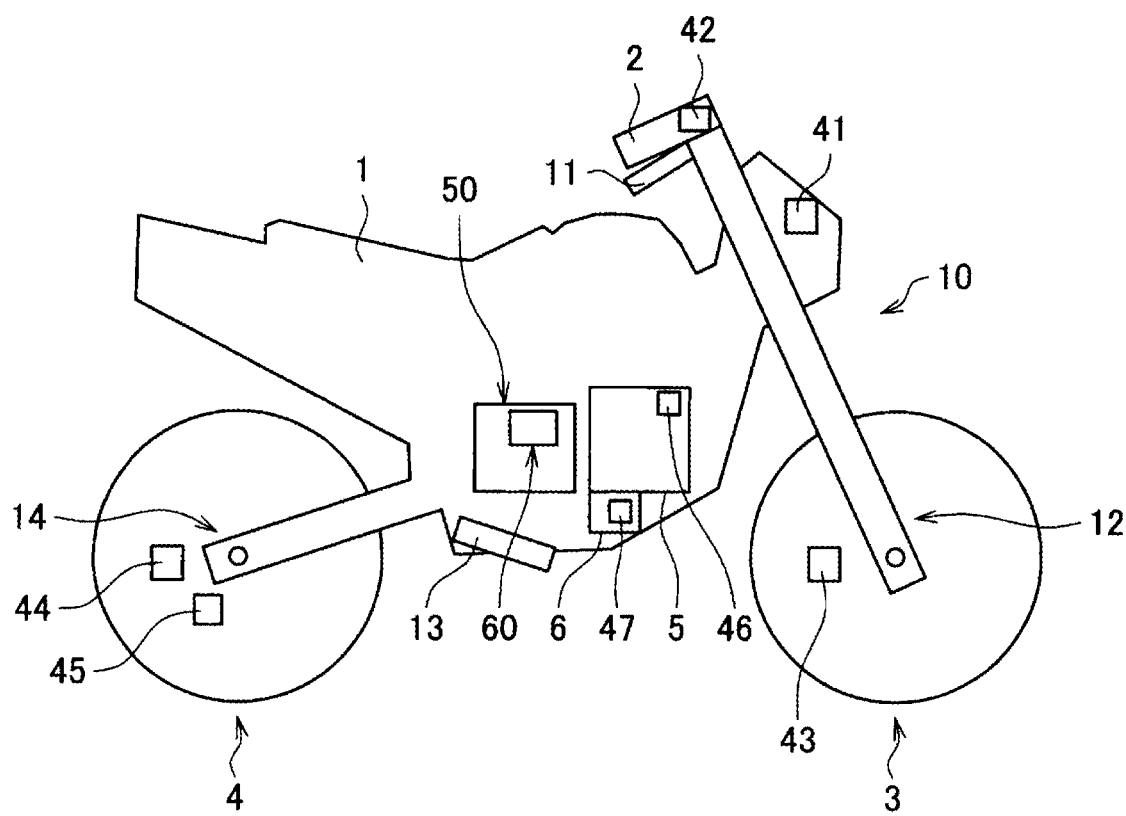

[FIG. 2]
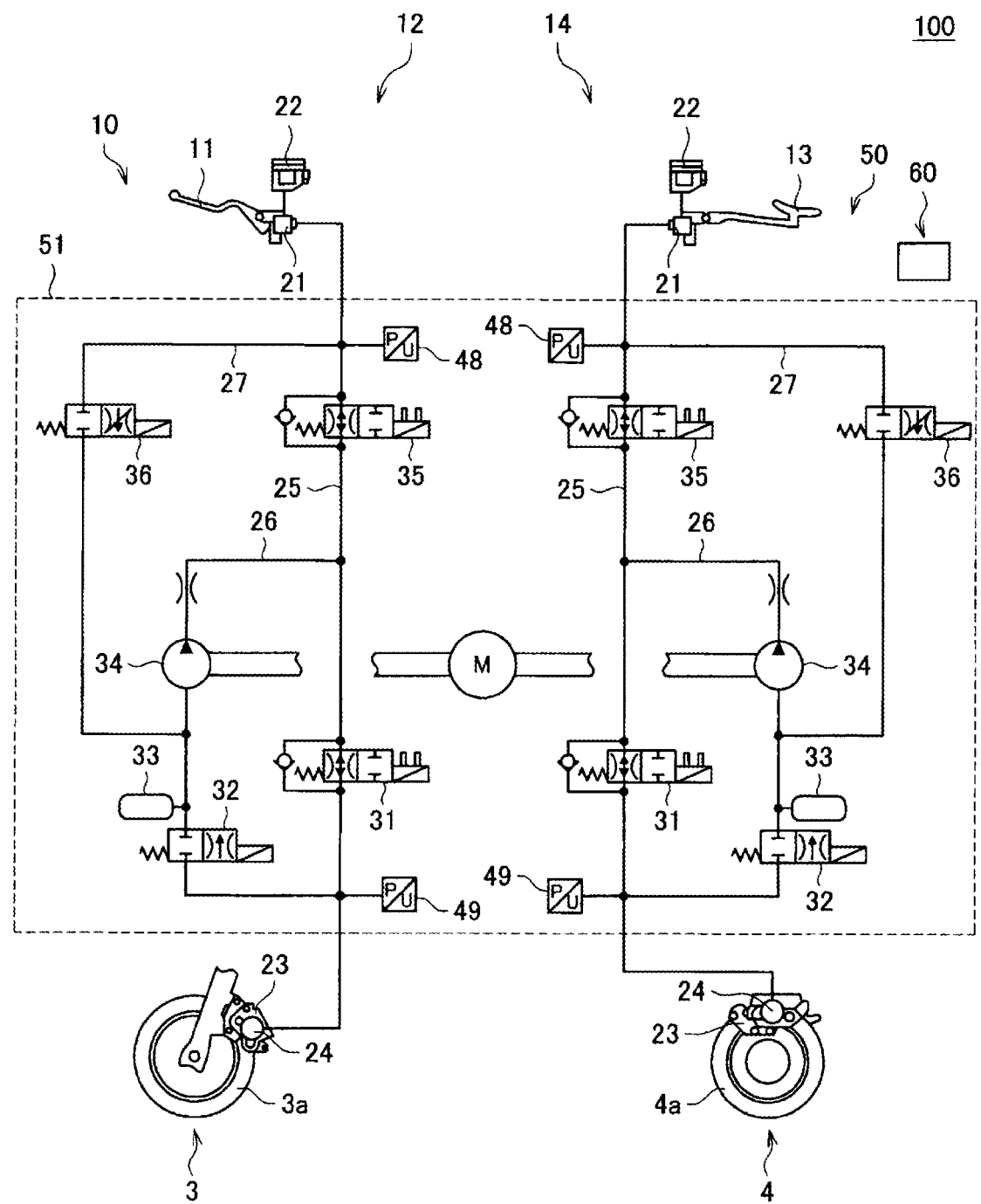

[FIG. 3]
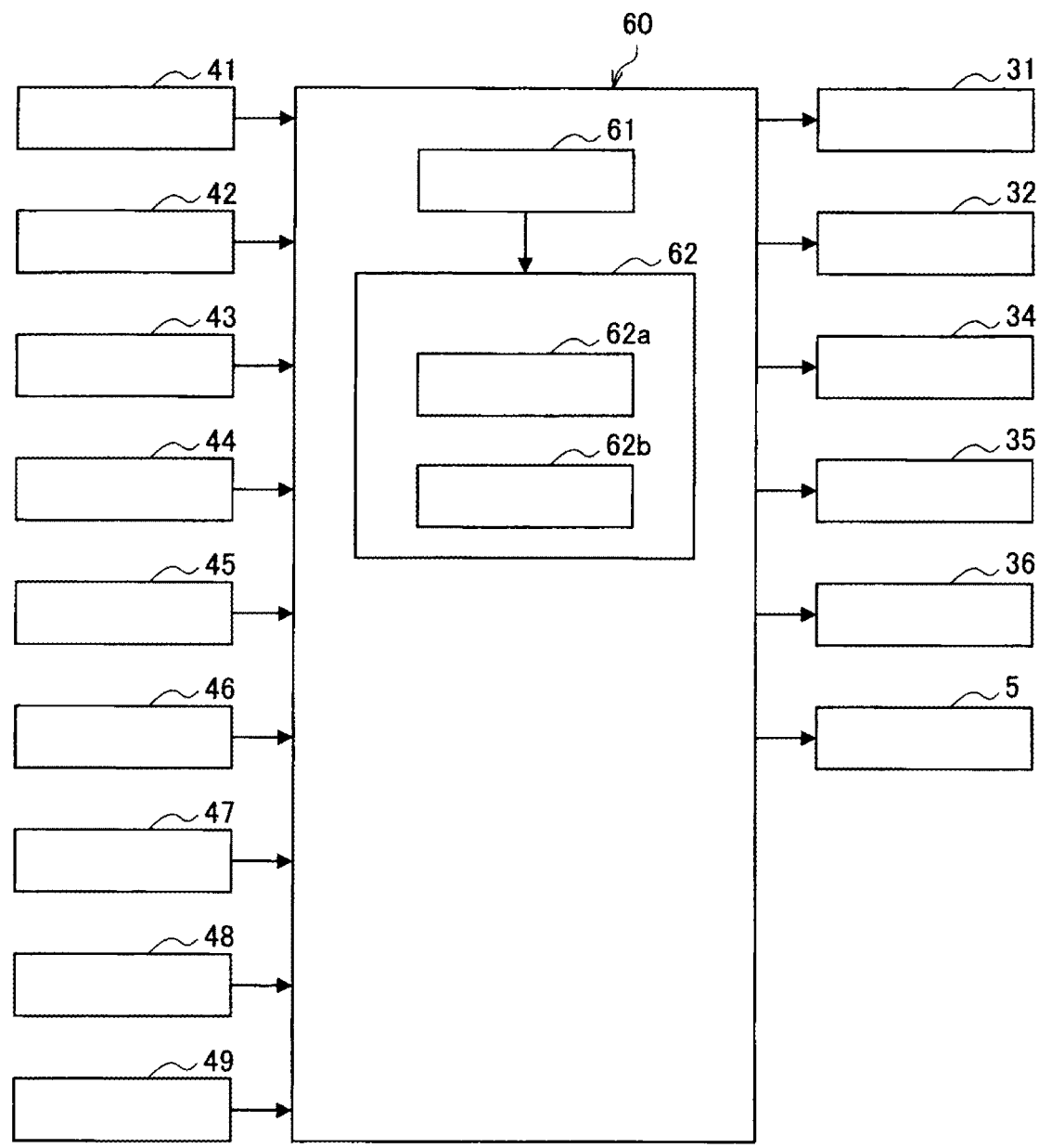

[FIG. 4]
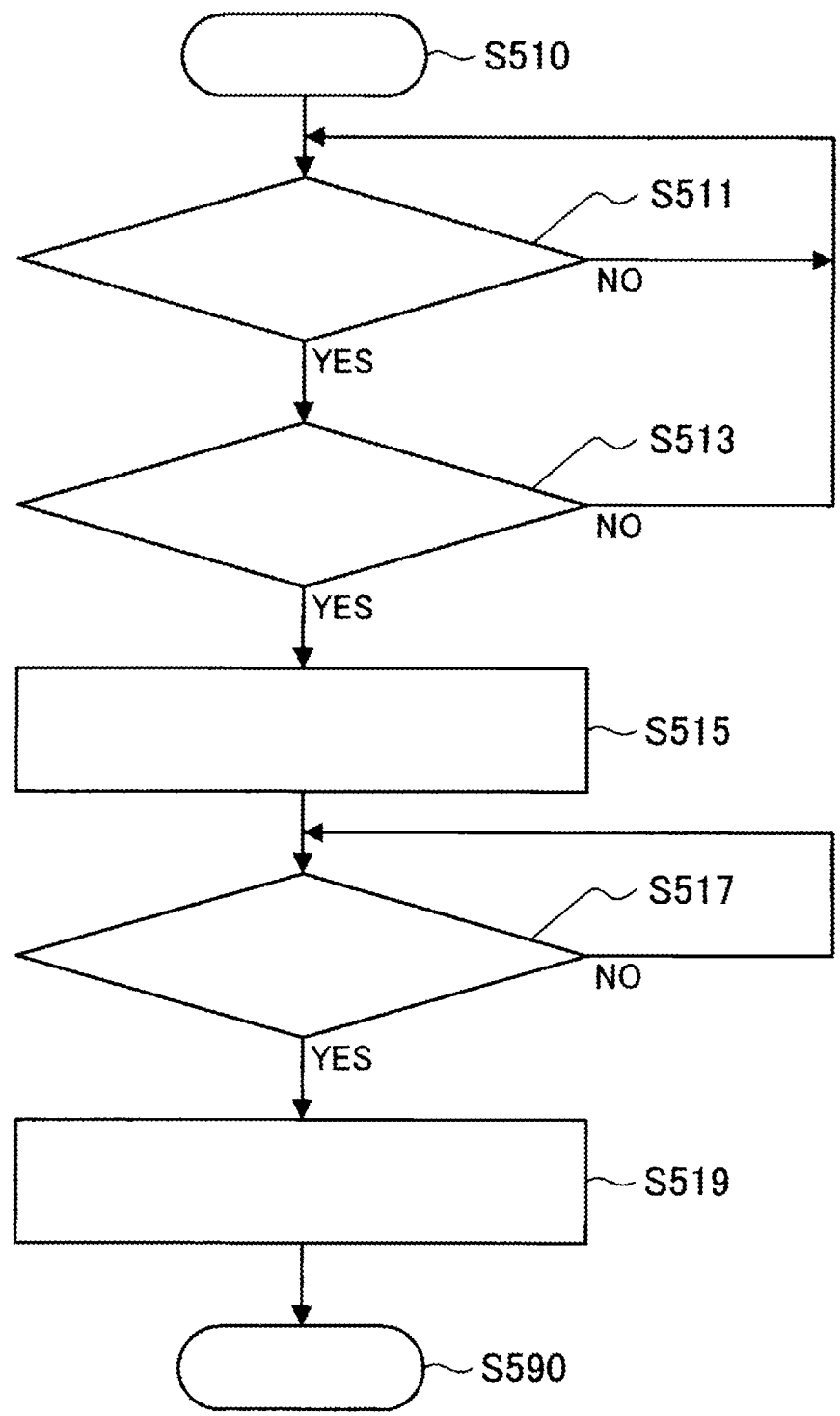

CONTROLLER AND CONTROL METHOD

BACKGROUND OF THE INVENTION

The present disclosure relates to a controller and a control method capable of securing a driver's comfort during adaptive cruise control for a straddle-type vehicle.

As a conventional technique relating to a straddle-type vehicle, a technique of assisting with a driver's operation is available.

For example, a driver assistance system is disclosed in JP-A-2009-116882. Based on information detected by a sensor that detects an obstacle present in a travel direction or substantially in the travel direction, the driver assistance system warns a motorcycle driver that the motorcycle inappropriately approaches the obstacle.

SUMMARY OF THE INVENTION

By the way, as a technique of assisting with the driver's operation, it is considered to apply adaptive cruise control, in which a vehicle is made to travel according to a distance from the vehicle to a preceding vehicle, motion of the vehicle, and the driver's instruction, to a straddle-type vehicle such as the motorcycle. In the adaptive cruise control for the straddle-type vehicle, the straddle-type vehicle is automatically accelerated or decelerated without relying on an acceleration or deceleration operation by the driver. Here, the straddle-type vehicle is accelerated by driving a drive wheel using drive power output from a drive source. However, at a time point at which the drive wheel starts being driven due to transmission of the drive power output from the drive source to the drive wheel, a shock occurs due to backlash of a gear or the like. During the adaptive cruise control, as described above, the straddle-type vehicle is automatically accelerated. Thus, the shock, which occurs at the time point at which the drive wheel starts being driven, is likely to become a cause of worsening the driver's comfort.

The present invention has been made in view of the above-described problem, and therefore obtains a controller and a control method capable of securing a driver's comfort during adaptive cruise control for a straddle-type vehicle.

Solution to Problem

A controller according to the present invention is a controller that controls travel of a straddle-type vehicle, and includes a control section capable of executing adaptive cruise control in which the straddle-type vehicle is made to travel according to a distance from the straddle-type vehicle to a preceding vehicle, motion of the straddle-type vehicle, and a driver's instruction. During the adaptive cruise control, when a state where a braking force is generated on at least one of wheels of the straddle-type vehicle is switched to a state where a drive wheel is driven using drive power output from a drive source of the straddle-type vehicle, the control section controls the braking force generated on the at least one of the wheels such that a reference braking force is generated on the drive wheel at a time point at which the drive wheel starts being driven due to transmission of the drive power output from the drive source to the drive wheel.

A control method according to the present invention is a control method for controlling travel of a straddle-type vehicle, and includes controlling a braking force generated on at least one of wheels by a controller such that a reference braking force is generated on a drive wheel at a time point at which the drive wheel starts being driven due to transmission of drive power output from a drive source to the drive wheel when a state where the braking force is generated on the at least one of the wheels of the straddle-type vehicle is switched to a state where the drive wheel is driven using the drive power output from the drive source of the straddle-type vehicle during adaptive cruise control in which the straddle-type vehicle is made to travel according to a distance from the straddle-type vehicle to a preceding vehicle, motion of the straddle-type vehicle, and a driver's instruction.

Advantageous Effects of Invention

In the controller and the control method according to the present invention, during the adaptive cruise control in which the straddle-type vehicle is made to travel according to the distance from the straddle-type vehicle to the preceding vehicle, the motion of the straddle-type vehicle, and the driver's instruction, when the state where the braking force is generated on at least one of the wheels of the straddle-type vehicle is switched to the state where the drive wheel is driven using the drive power output from the drive source of the straddle-type vehicle, the braking force generated on the at least of the wheels is controlled such that the reference braking force is generated on the drive wheel at the time point at which the drive wheel starts being driven due to the transmission of the drive power output from the drive source to the drive wheel. Thus, it is possible to alleviate a shock that occurs due to the transmission of the drive power at the time point at which the drive wheel starts being driven. Therefore, the driver's comfort can be secured during the adaptive cruise control for the straddle-type vehicle.

BRIEF DESCRIPTION OF THE DRAWINGS

FIG. 1 is a schematic view of a configuration of a motorcycle on which a controller according to an embodiment of the present invention is mounted.

FIG. 2 is a schematic view of a configuration of a brake system according to the embodiment of the present invention.

FIG. 3 is a block diagram of an exemplary functional configuration of the controller according to the embodiment of the present invention.

FIG. 4 is a flowchart of an exemplary processing procedure that is executed by the controller according to the embodiment of the present invention.

DETAILED DESCRIPTION

A description will hereinafter be made on a controller according to the present invention with reference to the drawings. Hereinafter, a description will be made on the controller used for a two-wheeled motorcycle. However, the controller according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a driver straddles. In addition, a description will hereinafter be made on a case where an engine is mounted as a drive source capable of outputting drive power for driving a wheel of the motorcycle. However, as the drive source of the motorcycle, a drive source other than the engine (for example, a motor) may be mounted, or multiple drive sources may be mounted. Furthermore, a description will hereinafter be made on a case where the motorcycle is a rear-wheel drive vehicle. However, the motorcycle may be a front-wheel-drive vehicle, and a reference braking force may be generated on a front wheel.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

<Configuration of Motorcycle>

A description will be made on a configuration of a motorcycle 100 on which a controller 60 according to an embodiment of the present invention is mounted with reference to FIG. 1 to FIG. 3.

FIG. 1 is a schematic view of the configuration of the motorcycle 100 on which the controller 60 is mounted. FIG. 2 is a schematic diagram of a configuration of a brake system 10. FIG. 3 is a block diagram of an exemplary functional configuration of the controller 60.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; an engine 5; a transmission mechanism 6; and the brake system 10. In this embodiment, the controller (ECU) 60 is provided in a hydraulic pressure control unit 50 of the brake system 10, which will be described later. As illustrated in FIG. 1 and FIG. 2, the motorcycle 100 further includes: an inter-vehicular distance sensor 41, an input device 42, a front-wheel rotational frequency sensor 43, a rear-wheel rotational frequency sensor 44, a torque sensor 45, a crank angle sensor 46, a gear position sensor 47, a master-cylinder pressure sensor 48, and a wheel-cylinder pressure sensor 49.

The engine 5 corresponds to an example of a drive source for the motorcycle 100, and can output drive power for driving a wheel (more specifically, the rear wheel 4 as a drive wheel). For example, the engine 5 is provided with: one or multiple cylinders in each of which a combustion chamber is formed; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided in an intake pipe of the engine 5, and an intake air amount for the combustion chamber varies according to a throttle opening amount as an opening degree of the throttle valve.

The crankshaft of the engine 5 is connected to an input shaft of the transmission mechanism 6, and an output shaft of the transmission mechanism 6 is connected to the rear wheel 4. Thus, the power output from the engine 5 is transmitted to the transmission mechanism 6, is changed by the transmission mechanism 6, and is then transmitted to the rear wheel 4. In detail, the crankshaft of the engine 5 and the input shaft of the transmission mechanism 6 are connected via a clutch that connects/disconnects the power transmission. When the clutch is operated, a gear stage of the transmission mechanism 6 is switched according to a shift lever operation by the driver in a disengaged state of the clutch.

As illustrated in FIG. 1 and FIG. 2, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13. The brake system 10 also includes the hydraulic pressure control unit 50, and a part of the front-wheel brake mechanism 12 and a part of the rear-wheel brake mechanism 14 are included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided on the handlebar 2 and is operated by the driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided in the brake caliper 23; a primary channel 25 through which a brake fluid in the master cylinder 21 flows into the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. Between an end of the primary channel 25 on the master cylinder 21 side and a portion of the primary channel 25 to which a downstream end of the secondary channel 26 is connected, a first valve (USV) 35 is provided. The supply channel 27 communicates between the master cylinder 21 and a portion of the secondary channel 26 on a suction side of the pump 34. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50 includes: components such as the inlet valves 31, the outlet valves 32, the accumulators 33, the pumps 34, the first valves 35, and the second valves 36 used to control a brake hydraulic pressure; a base body 51 in which those components are provided and channels constituting the primary channels 25, the secondary channels 26, and the supply channels 27 are formed; and the controller 60.

The base body 51 may be formed of one member or may be formed of multiple members. In the case where the base body 51 is formed of the multiple members, the components may separately be provided in the different members.

The controller 60 controls operation of each of the components in the hydraulic pressure control unit 50. As a result, the braking force to be generated on the front wheel 3 by the front-wheel brake mechanism 12 and the braking force to be generated on the rear wheel 4 by the rear-wheel brake mechanism 14 are controlled.

For example, in a normal time (that is, when none of adaptive cruise control and anti-lock brake control, which will be described later, is executed), the controller 60 opens the inlet valves 31, closes the outlet valves 32, opens the first valves 35, and closes the second valves 36. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3*a* of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4*a* of the rear wheel 4, and the braking force is thereby generated on the rear wheel 4.

The inter-vehicular distance sensor 41 detects a distance from the motorcycle 100 to a preceding vehicle. The inter-vehicular distance sensor 41 may detect another physical quantity that can substantially be converted to the distance from the motorcycle 100 to the preceding vehicle. Here, the preceding vehicle means a vehicle ahead of the motorcycle 100 and may include, in addition to the nearest vehicle from the motorcycle 100 on the same lane as a travel lane of the motorcycle 100, a vehicle ahead of several vehicles in front of the motorcycle 100, a vehicle traveling on an adjacent lane to the travel lane of the motorcycle 100, and the like. For example, in the case where the multiple vehicles exist ahead of the motorcycle 100, based on a track, which is estimated as a travel track of the motorcycle 100, and behavior of each of the multiple vehicles, the inter-vehicular distance sensor 41 selects the preceding vehicle as a detection target of the distance from the motorcycle 100. In this case, the adaptive cruise control, which will be described later, is executed by using a detection result of the distance from the motorcycle 100 to the thus-selected preceding vehicle.

As the inter-vehicular distance sensor 41, for example, a camera that captures an image in front of the motorcycle 100 and a radar that can detect a distance from the motorcycle 100 to a target in front are used. In such a case, for example, the preceding vehicle is recognized by using the image captured by the camera. Then, by using the recognition result of the preceding vehicle and a detection result by the radar, the distance from the motorcycle 100 to the preceding vehicle can be detected. The inter-vehicular distance sensor 41 is provided in a front portion of the trunk 1, for example. Note that the configuration of the inter-vehicular distance sensor 41 is not limited to the above example, and a stereo camera may be used as the inter-vehicular distance sensor 41, for example.

The input device 42 accepts a travel mode selection operation by the driver, and outputs information indicative of the travel mode selected by the driver. As will be described later, in the motorcycle 100, the controller 60 can execute the adaptive cruise control. The adaptive cruise control is control in which the motorcycle 100 is made to travel according to the distance from the motorcycle 100 to the preceding vehicle, motion of the motorcycle 100, and the driver's instruction. By using the input device 42, the driver can select, as one of the travel modes, a travel mode in which the adaptive cruise control is executed. For example, as the input device 42, a lever, a button, a touch screen, or the like is used. The input device 42 is provided on the handlebar 2, for example.

The front-wheel rotational frequency sensor 43 detects a rotational frequency of the front wheel 3 and outputs a detection result. The front-wheel rotational frequency sensor 43 may detect another physical quantity that can substantially be converted to the rotational frequency of the front wheel 3. The front-wheel rotational frequency sensor 43 is provided on the front wheel 3.

The rear-wheel rotational frequency sensor 44 detects a rotational frequency of the rear wheel 4 and outputs a detection result. The rear-wheel rotational frequency sensor 44 may detect another physical quantity that can substantially be converted to the rotational frequency of the rear wheel 4. The rear-wheel rotational frequency sensor 44 is provided on the rear wheel 4.

The torque sensor 45 detects torque acting on the rear wheel 4 and outputs a detection result. The torque sensor 45 may detect another physical quantity that can substantially be converted to the torque acting on the rear wheel 4. The torque sensor 45 is provided on the rear wheel 4.

The crank angle sensor 46 detects a crank angle of the engine 5 and outputs a detection result. The crank angle sensor 46 may detect another physical quantity that can substantially be converted to the crank angle of the engine 5. The crank angle sensor 46 is provided in the engine 5.

The gear position sensor 47 detects at which gear stage the gear stage of the transmission mechanism 6 is set, and outputs a detection result. The gear position sensor 47 is provided in the transmission mechanism 6.

The master-cylinder pressure sensor 48 detects the hydraulic pressure of the brake fluid in the master cylinder 21, and outputs a detection result. The master-cylinder pressure sensor 48 may detect another physical quantity that can substantially be converted to the hydraulic pressure of the brake fluid in the master cylinder 21. The master-cylinder pressure sensor 48 is provided in each of the front-wheel brake mechanism 12 and the rear-wheel brake mechanism 14.

The wheel-cylinder pressure sensor 49 detects the hydraulic pressure of the brake fluid in the wheel cylinder 24, and outputs a detection result. The wheel-cylinder pressure sensor 49 may detect another physical quantity that can substantially be converted to the hydraulic pressure of the brake fluid in the wheel cylinder 24. The wheel-cylinder pressure sensor 49 is provided in each of the front-wheel brake mechanism 12 and the rear-wheel brake mechanism 14.

The controller 60 controls travel of the motorcycle 100.

For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

As illustrated in FIG. 3, the controller 60 includes an acquisition section 61 and a control section 62, for example.

The acquisition section 61 acquires information that is output from each of the devices mounted on the motorcycle 100, and outputs the acquired information to the control section 62. For example, the acquisition section 61 acquires the information output from the inter-vehicular distance sensor 41, the input device 42, the front-wheel rotational frequency sensor 43, the rear-wheel rotational frequency sensor 44, the torque sensor 45, the crank angle sensor 46, the gear position sensor 47, the master-cylinder pressure sensor 48, and the wheel-cylinder pressure sensor 49.

The control section 62 controls operation of each of the devices mounted on the motorcycle 100, so as to control the drive power and the braking force exerted on the motorcycle 100.

Here, by controlling the operation of each of the devices mounted on the motorcycle 100, the control section 62 can execute the adaptive cruise control in which the motorcycle 100 is made to travel according to the distance from the motorcycle 100 to the preceding vehicle, the motion of the motorcycle 100, and the driver's instruction. More specifically, in the case where the driver selects the travel mode in which the adaptive cruise control is executed, the control section 62 executes the adaptive cruise control. Note that, in the case where the driver performs an accelerator operation or a brake operation during the adaptive cruise control, the control section 62 cancels the adaptive cruise control.

In the adaptive cruise control, the distance from the motorcycle 100 to the preceding vehicle is controlled to approximate a reference distance. As the distance from the motorcycle 100 to the preceding vehicle, the reference distance is set to a value with which the driver's safety can be secured. In the case where no preceding vehicle is recognized, a speed of the motorcycle 100 is controlled at a set speed, which is set in advance. In addition, in the adaptive cruise control, each of the acceleration and the deceleration of the motorcycle 100 is controlled to be equal to or lower than an upper limit value of such extent that does not worsen the driver's comfort.

More specifically, during the adaptive cruise control, the control section 62 calculates a target value of the acceleration (hereinafter referred to as target acceleration) or a target value of the deceleration (hereinafter referred to as target deceleration) on the basis of a comparison result between the distance from the motorcycle 100 to the preceding vehicle and the reference distance and on the basis of a relative speed between the motorcycle 100 and the preceding vehicle. Then, based on a calculation result, the control section 62 controls the drive power and the braking force exerted on the motorcycle 100.

For example, in the case where the distance from the motorcycle 100 to the preceding vehicle is longer than the reference distance, the control section 62 calculates the target acceleration that corresponds to a difference between the distance from the motorcycle 100 to the preceding vehicle and the reference distance. On the other hand, in the case where the distance from the motorcycle 100 to the preceding vehicle is shorter than the reference distance, the control section 62 calculates the target deceleration that corresponds to the difference between the distance from the motorcycle 100 to the preceding vehicle and the reference distance.

The control section 62 includes a drive control section 62a and a brake control section 62b, for example.

The drive control section 62a controls the drive power that is transmitted to the rear wheel 4 as the drive wheel during the adaptive cruise control. More specifically, during the adaptive cruise control, the drive control section 62a outputs a command to an engine control unit (not illustrated), which outputs a signal to control operation of each of the components of the engine 5 (the throttle valve, the fuel injector, the ignition plug, and the like). In this way, the drive control section 62a controls operation of the engine 5. As a result, during the adaptive cruise control, the drive power, which is output from the engine 5 and transmitted to the rear wheel 4, is controlled.

In the normal time, the operation of the engine 5 is controlled by the engine control unit such that the drive power is transmitted to the rear wheel 4 in response to the driver's accelerator operation.

Meanwhile, during the adaptive cruise control, the drive control section 62a controls the operation of the engine 5 such that the drive power is transmitted to the rear wheel 4 without relying on the driver's accelerator operation. More specifically, during the adaptive cruise control, the drive control section 62a controls the operation of the engine 5 such that the acceleration of the motorcycle 100 becomes the target acceleration, which is calculated on the basis of the distance from the motorcycle 100 to the preceding vehicle and the relative speed between the motorcycle 100 and the preceding vehicle. In this way, the drive control section 62a controls the drive power transmitted to the rear wheel 4.

The brake control section 62b controls the operation of each of the components of the hydraulic pressure control unit 50 in the brake system 10, so as to control the braking force generated on each of the wheels of the motorcycle 100.

In the normal time, as described above, the brake control section 62b controls the operation of each of the components of the hydraulic pressure control unit 50 such that the braking force is generated on each of the wheels in response to the driver's brake operation.

Meanwhile, during the adaptive cruise control, the brake control section 62b controls the operation of each of the components such that the braking force is generated on each of the wheels without relying on the driver's brake operation. More specifically, during the adaptive cruise control, the brake control section 62b controls the operation of each of the components of the hydraulic pressure control unit 50 such that the deceleration of the motorcycle 100 becomes the target deceleration, which is calculated on the basis of the distance from the motorcycle 100 to the preceding vehicle and the relative speed between the motorcycle 100 and the preceding vehicle. In this way, the brake control section 62b controls the braking force generated on each of the wheels.

For example, during the adaptive cruise control, the brake control section 62b brings the motorcycle 100 into a state where the inlet valves 31 are opened, the outlet valves 32 are closed, the first valves 35 are closed, and the second valves 36 are opened, and drives the pumps 34 in such a state, so as to increase the hydraulic pressure of the brake fluid in each of the wheel cylinders 24 and generate the braking force on each of the wheels. In addition, the brake control section 62b regulates the hydraulic pressure of the brake fluid in each of the wheel cylinders 24 by controlling an opening amount of the first valve 35, for example. In this way, the brake control section 62b can control the braking force generated on each of the wheels.

Here, during the adaptive cruise control, the brake control section 62b separately controls operation of each of the front-wheel brake mechanism 12 and the rear-wheel brake mechanism 14, so as to separately control the hydraulic pressure of the brake fluid in the wheel cylinder 24 of each of the front-wheel brake mechanism 12 and the rear-wheel brake mechanism 14. In this way, the brake control section 62b can control braking force distribution between the front and rear wheels (that is, distribution of the braking force generated on the front wheel 3 and the braking force generated on the rear wheel 4). More specifically, the brake control section 62b controls the braking force distribution between the front and rear wheels such that a total of target values of the braking forces generated on the wheels becomes a requested braking force (that is, the braking force that is requested at the time of braking during the adaptive cruise control) corresponding to the target deceleration. The requested braking force is specifically the required braking force to bring the deceleration of the motorcycle 100 to the target deceleration, which is calculated on the basis of the distance from the motorcycle 100 to the preceding vehicle and the relative speed between the motorcycle 100 and the preceding vehicle.

Note that, in the case where at least one of the wheels is locked or possibly locked, the brake control section 62b may execute the anti-lock brake control. The anti-lock brake control is control for regulating the braking force of the wheel, which is locked or possibly locked, to such a magnitude that locking of the wheel can be avoided.

For example, during the anti-lock brake control, the brake control section 62b brings the motorcycle 100 into a state where the inlet valves 31 are closed, the outlet valves 32 are opened, the first valves 35 are opened, and the second valves 36 are closed, and drives the pumps 34 in such a state, so as to reduce the hydraulic pressure of the brake fluid in each of the wheel cylinders 24 and reduce the braking force generated on each of the wheels. In addition, the brake control section 62b closes both of the inlet valves 31 and the outlet valves 32 from the above state, for example. In this way, the brake control section 62b can keep the hydraulic pressure of the brake fluid in each of the wheel cylinders 24 and thus can keep the braking force generated on the each of wheels. Furthermore, the brake control section 62b opens the inlet valves 31 and closes the outlet valves 32 from the above state, for example. In this way, the brake control section 62b can increase the hydraulic pressure of the brake fluid in each of the wheel cylinders 24 and thus can increase the braking force generated on each of the wheels.

As described above, in the controller 60, the control section 62 can execute the adaptive cruise control. Here, during the adaptive cruise control, when a state where the braking force is generated on each of the wheels of the motorcycle 100 (hereinafter also referred to as a decelerated state) is switched to a state where the rear wheel 4 is driven using the drive power output from the engine 5 of the motorcycle 100 (hereinafter also referred to as an accelerated state), the control section 62 controls the braking force generated on each of the wheels such that the reference braking force is generated on the rear wheel 4 at a time point at which the rear wheel 4 starts being driven due to the transmission of the drive power output from the engine 5 to the rear wheel 4. In this way, the driver's comfort can be secured during the adaptive cruise control for the motorcycle 100. A detailed description will be made below on such processing that is related to switching from the decelerated state to the accelerated state during the adaptive cruise control and is executed by the controller 60.

Note that the above decelerated state may include a state where the braking force is generated on each of the wheels due to action of engine brake, in addition to the state where the braking force is generated on each of the wheels by controlling the operation of each of the components of the hydraulic pressure control unit 50 in the brake system 10.

The description has been made above on the example in which the drive control section 62a controls the operation of the engine 5 via the engine control unit. However, the drive control section 62a may output a signal for controlling the operation of each of the components of the engine 5, so as to directly control the operation of each of the components of the engine 5. In such a case, the drive control section 62a controls the operation of the engine 5 in the normal time in a similar manner to the operation of the engine 5 during the adaptive cruise control.

<Operation of Controller>

A description will be made on operation of the controller 60 according to the embodiment of the present invention with reference to FIG. 4.

FIG. 4 is a flowchart of an exemplary processing procedure that is executed by the controller 60. More specifically, a control flow illustrated in FIG. 4 corresponds to a processing procedure that is related to switching from the decelerated state to the accelerated state during the adaptive cruise control and is executed by the control section 62 of the controller 60, and is repeatedly executed during the adaptive cruise control. In addition, step S510 and step S590 in FIG. 4 respectively correspond to initiation and termination of the control flow illustrated in FIG. 4.

When the control flow illustrated in FIG. 4 is initiated, in step S511, the control section 62 determines whether the wheels of the motorcycle 100 are braked. If it is determined that the wheels of the motorcycle 100 are braked (step S511/YES), the processing proceeds to step S513. On the other hand, if it is determined that the wheels of the motorcycle 100 are not braked (step S511/NO), the determination processing in step S511 is repeated.

If it is determined YES in step S511, in step S513, the control section 62 determines whether the engine 5 starts outputting the drive power. If it is determined that the engine 5 starts outputting the drive power (step S513/YES), the processing proceeds to step S515. On the other hand, if it is determined that the engine 5 does not start outputting the drive power (step S513/NO), the processing returns to the determination processing in step S511.

For example, the control section 62 determines that the engine 5 starts outputting the drive power in the case where a request to start accelerating the motorcycle 100 is generated and where a command that causes the engine 5 to start outputting the drive power is output to the engine control unit. Note that the control section 62 may determine whether the engine 5 starts outputting the drive power by a different method from the above. For example, the control section 62 may determine whether the engine 5 starts outputting the drive power on the basis of a temporal change in a parameter such as an engine speed, a fuel injection amount, or the like.

If it is determined YES in step S513, in step S515, the brake control section 62b makes the brake system 10 start applying the reference braking force to the rear wheel 4. For example, the reference braking force is set to the braking force of such extent that can maintain acceleration performance of the motorcycle 100 to desired performance while alleviating a shock generated at the time point at which rear wheel 4 starts being driven. In step S515, more specifically, the brake control section 62b stops the application of the braking force to the front wheel 3, and then starts the application of the reference braking force to the rear wheel 4. However, for example, the braking force may temporarily be generated on the front wheel 3 after a time point at which it is determined that the engine 5 starts outputting the drive power.

As described above, at the time point, at which it is determined that the engine 5 starts outputting the drive power, onward, the brake control section 62*b* continuously generates the reference braking force on the rear wheel 4. As will be described below, the state where the reference braking force is generated on the rear wheel 4 continues to the time point at which the rear wheel 4 starts being driven due to the transmission of the drive power output from the engine 5 to the rear wheel 4. Thus, the reference braking force is generated on the rear wheel 4 at the time point at which the rear wheel 4 starts being driven.

More specifically, the drive power output from the engine 5 is transmitted to the rear wheel 4 via a power transmission system including the transmission mechanism 6. When the drive power is transmitted to the rear wheel 4 at the time of starting driving of the rear wheel 4, the shock occurs due to backlash of a gear in the power transmission system or the like, for example. Here, as described above, at the time point at which the rear wheel 4 starts being driven, the controller 60 causes the generation of the reference braking force on the rear wheel 4. Thus, it is possible to alleviate the shock that occurs due to the transmission of the drive power at the time point at which the rear wheel 4 starts being driven.

Preferably, from a perspective of alleviating the shock, which occurs at the time point of starting driving of the rear wheel 4, the brake control section 62*b* appropriately sets the above reference braking force.

For example, from a perspective of appropriately alleviating the shock, which occurs at the time point of starting driving of the rear wheel 4, the brake control section 62*b* preferably controls the reference braking force to such a magnitude that corresponds to a gear ratio of the transmission mechanism 6.

In addition, for example, from a perspective of further appropriately alleviating the shock, which occurs at the time point of starting driving of the rear wheel 4, the brake control section 62*b* preferably controls the reference braking force to such a magnitude that corresponds to the drive power output from the engine 5.

Here, the brake control section 62*b* may control the reference braking force on the basis of the multiple parameters (for example, both of the gear ratio of the transmission mechanism 6 and the drive power output from the engine 5).

Next, in step S517, the control section 62 determines whether the rear wheel 4 starts being driven due to the transmission of the drive power output from the engine 5 to the rear wheel 4. If it is determined that the rear wheel 4 starts being driven (step S517/YES), the processing proceeds to step S519. On the other hand, if it is determined that the rear wheel 4 does not start being driven (step S517/NO), the determination processing in step S517 is repeated.

For example, the control section 62 determines that the rear wheel 4 starts being driven in the case where the torque acting on the rear wheel 4 starts being increased. Such a determination can be made by using the detection result by the torque sensor 45.

Alternatively, the control section 62 determines that the rear wheel 4 starts being driven in the case where rotational acceleration of the rear wheel 4 starts being increased. Such a determination can be made by using the detection result by the rear-wheel rotational frequency sensor 44.

If it is determined YES in step S517, in step S519, the brake control section 62*b* makes the brake system 10 stop applying the reference braking force to the rear wheel 4.

As described above, the brake control section 62*b* stops the generation of the reference braking force on the rear wheel 4 in the case where it is determined that the rear wheel 4 starts being driven.

Next, the control flow illustrated in FIG. 4 is terminated.

As described above, in the control flow illustrated in FIG. 4, at the time of switching from the decelerated state to the accelerated state during the adaptive cruise control, the control section 62 controls the braking force generated on each of the wheels such that the reference braking force is generated on the rear wheel 4 at the time point at which the rear wheel 4 starts being driven due to the transmission of the drive power output from the engine 5 to the rear wheel 4.

The above description has been made on the example in which the reference braking force is generated on the rear wheel 4 at the time point at which it is determined that the engine 5 starts outputting the drive power. However, the time point at which the reference braking force is generated on the rear wheel 4 (that is, the time point at which the reference braking force starts being applied to the rear wheel 4) is not limited to the above example.

More specifically, the brake control section 62*b* may cause the generation of the reference braking force on the rear wheel 4 at a time point corresponding to the time point at which the engine 5 starts outputting the drive power. For example, the brake control section 62*b* may cause the generation of the reference braking force on the rear wheel 4 at a time point later than the time point, at which the engine 5 starts outputting the drive power, by first reference duration. For example, the first reference duration is set to shorter duration than average duration that is assumed as duration from the time point at which the engine 5 starts outputting the drive power to the time point at which the rear wheel 4 starts being driven.

Note that, as the time point at which the engine 5 starts outputting the drive power, for example, the time point at which the engine 5 starts outputting the drive power may be used, or a time point at which duration corresponding to a delay in communication between the devices, responsiveness of each of the components in the engine 5, or the like is added to the above time point may be used.

In addition, the brake control section 62*b* may estimate the time point at which the rear wheel 4 starts being driven, and may cause the generation of the reference braking force on the rear wheel 4 at a time point corresponding to the estimated time point. For example, the brake control section 62*b* may cause the generation of the reference braking force on the rear wheel 4 at a time point prior to the time point, which is estimated as the time point at which the rear wheel 4 starts being driven, by second reference duration. For example, the second reference duration is set to such duration that the reliable generation of the reference braking force on the rear wheel 4 is maintained at the time point at which the rear wheel 4 starts being driven.

Note that the brake control section 62*b* can estimate the time point at which the rear wheel 4 starts being driven by estimating the duration that takes until the rear wheel 4 starts being driven on the basis of the crank angle of the engine 5, for example. Such estimation can be made by using the detection result by the crank angle sensor 46.

The above description has been made on the example in which the generation of the reference braking force on the rear wheel 4 is stopped in the case where it is determined that the rear wheel 4 starts being driven. However, the time point at which the generation of the reference braking force on the rear wheel 4 is stopped (that is, the time point at which the reference braking force stops being applied to the rear wheel 4) is not limited to the above example.

More specifically, the brake control section 62*b* may estimate the time point at which the rear wheel 4 starts being driven, and may stop the generation of the reference braking force on the rear wheel 4 at a time point corresponding to the estimated time point. For example, the brake control section 62*b* may stop the generation of the reference braking force on the rear wheel 4 at a time point later than the time point, which is estimated as the time point at which the rear wheel 4 starts being driven, by third reference duration. For example, the third reference duration is set to such duration that the state where the reference braking force is generated on the rear wheel 4 can promptly be canceled after the time point at which the rear wheel 4 starts being driven elapses.

<Effects of Controller>

A description will be made on effects of the controller 60 according to the embodiment of the present invention.

During the adaptive cruise control, when the state where the braking force is generated on at least one of the wheels of the motorcycle 100 is switched to the state where the rear wheel 4 as the drive wheel is driven using the drive power output from the engine 5 as the drive source of the motorcycle 100, the control section 62 of the controller 60 controls the braking force generated on the at least one of the wheels such that the reference braking force is generated on the rear wheel 4 at the time point at which the rear wheel 4 starts being driven due to the transmission of the drive power output from the engine 5 to the rear wheel 4. In this way, it is possible to alleviate the shock that occurs due to the transmission of the drive power at the time point of starting driving of the rear wheel 4. Thus, the driver's comfort can be secured during the adaptive cruise control for the motorcycle 100.

Preferably, in the controller 60, the control section 62 controls the reference braking force on the basis of the gear ratio of the transmission mechanism 6 in the motorcycle 100. Here, at the time point at which the rear wheel 4 starts being driven, a magnitude of the drive power transmitted to the rear wheel 4 varies according to the gear ratio of the transmission mechanism 6. More specifically, in the case where the constant drive power is output from the engine 5, the magnitude of the drive power is increased with the higher gear ratio. Accordingly, by controlling the reference braking force on the basis of the gear ratio of the transmission mechanism 6 in the motorcycle 100, the reference braking force can appropriately be controlled according to the magnitude of the drive power that is transmitted to the rear wheel 4 at the time point at which the rear wheel 4 starts being driven. Thus, it is possible to further appropriately alleviate the shock that occurs at the time point at which the rear wheel 4 starts being driven.

Preferably, in the controller 60, the control section 62 controls the reference braking force on the basis of the drive power output from the engine 5. Here, at the time point at which the rear wheel 4 starts being driven, the magnitude of the drive power transmitted to the rear wheel 4 varies according to the drive power output from the engine 5. Accordingly, by controlling the reference braking force on the basis of the drive power output from the engine 5, the reference braking force can appropriately be controlled according to the magnitude of the drive power that is transmitted to the rear wheel 4 at the time point at which the rear wheel 4 starts being driven. Thus, it is possible to further appropriately alleviate the shock that occurs at the time point at which the rear wheel 4 starts being driven.

Preferably, in the controller 60, the control section 62 causes the continuous generation of the reference braking force on the rear wheel 4 at the time point, at which it is determined that the engine 5 starts outputting the drive power, onward, and then stops the generation of the reference braking force on the rear wheel 4 in the case where it is determined that the rear wheel 4 starts being driven. In this way, it is possible to improve the reliable generation of the reference braking force on the rear wheel 4 at the time point at which the rear wheel 4 starts being driven. Thus, it is possible to further appropriately alleviate the shock that occurs due to the transmission of the drive power at the time point at which the rear wheel 4 starts being driven.

Preferably, in the controller 60, the control section 62 causes the generation of the reference braking force on the rear wheel 4 at the time point corresponding to the time point at which the engine 5 starts outputting the drive power. In this way, while the reliable generation of the reference braking force on the rear wheel 4 at the time point at which the rear wheel 4 starts being driven is appropriately maintained, deterioration of the acceleration performance of the motorcycle 100, which is caused by the generation of the reference braking force before the time point at which the rear wheel 4 starts being driven, can be suppressed. Thus, it is possible to appropriately secure the acceleration performance of the motorcycle 100 while alleviating the shock that occurs due to the transmission of the drive power at the time point at which the rear wheel 4 starts being driven.

Preferably, in the controller 60, the control section 62 estimates the time point at which the rear wheel 4 starts being driven, and causes the generation of the reference braking force on the rear wheel 4 at the time point corresponding to the estimated time point. In this way, while the reliable generation of the reference braking force on the rear wheel 4 at the time point at which the rear wheel 4 starts being driven is appropriately maintained, the deterioration of the acceleration performance of the motorcycle, which is caused by the generation of the reference braking force before the time point at which the rear wheel 4 starts being driven, can be suppressed. Thus, it is possible to appropriately secure the acceleration performance of the motorcycle 100 while alleviating the shock that occurs due to the transmission of the drive power at the time point at which the rear wheel 4 starts being driven.

Preferably, in the controller 60, the control section 62 estimates the time point at which the rear wheel 4 starts being driven, and stops the generation of the reference braking force on the rear wheel 4 at the time point corresponding to the estimated time point. In this way, it is possible to promptly cancel the state where the reference braking force is generated on the rear wheel 4 after the time point at which the rear wheel 4 starts being driven elapses. Therefore, it is possible to further appropriately secure the acceleration performance of the motorcycle 100.

The present invention is not limited to each of the embodiments that have been described. For example, all or parts of the embodiments may be combined, or only a part of each of the embodiments may be implemented.

REFERENCE SIGNS LIST

1: Trunk
2: Handlebar
3: Front wheel
3*a*: Rotor

4: Rear wheel
4a: Rotor
5: Engine
6: Transmission mechanism
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Inter-vehicular distance sensor
42: Input device
43: Front-wheel rotational frequency sensor
44: Rear-wheel rotational frequency sensor
45: Torque sensor
46: Crank angle sensor
47: Gear position sensor
48: Master-cylinder pressure sensor
49: Wheel-cylinder pressure sensor
50: Hydraulic pressure control unit
51: Base body
60: Controller
61: Acquisition section
62: Control section
62a: Drive control section
62b: Brake control section
100: Motorcycle

The invention claimed is:

1. A controller (60) that controls travel of a straddle-type vehicle (100), the controller comprising:
an electronic processor (62) configured to execute adaptive cruise control in which the straddle-type vehicle (100) is made to travel according to a distance from said straddle-type vehicle (100) to a preceding vehicle, motion of said straddle-type vehicle (100), and a driver's instruction,
wherein
during the adaptive cruise control, when a state where a braking force is generated on at least one of wheels (3, 4) of the straddle-type vehicle (100) is switched to a state where a drive wheel (4) is driven using drive power output from a drive source (5) of the straddle-type vehicle (100), and
the electronic processor (62) controls the braking force generated on the at least one of the wheels (3, 4) such that a reference braking force is generated on the drive wheel (4) at a time point at which the drive wheel (4) starts being driven due to transmission of the drive power output from the drive source (5) to the drive wheel (4).

2. The controller according to claim 1, wherein the electronic processor (62) controls the reference braking force on the basis of a gear ratio of a transmission mechanism (6) in the straddle-type vehicle (100).

3. The controller according to claim 1, wherein the electronic processor (62) controls the reference braking force on the basis of the drive power output from the drive source (5).

4. The controller according to claim 1, wherein the electronic processor (62) causes continuous generation of the reference braking force on the drive wheel (4) at the time point, at which it is determined that the drive source (5) starts outputting the drive power, onward, and then stops the generation of the reference braking force on the drive wheel (4) in the case where it is determined that the drive wheel (4) starts being driven.

5. The controller according to claim 1, wherein the electronic processor (62) causes the generation of the reference braking force on the drive wheel (4) at a time point corresponding to a time point at which the drive source (5) starts outputting the drive power.

6. The controller according to claim 1, wherein the electronic processor (62) estimates the time point at which the drive wheel (4) starts being driven, and causes the generation of the reference braking force on the drive wheel (4) at a time point corresponding to said estimated time point.

7. The controller according to claim 1, wherein the electronic processor (62) estimates the time point at which the drive wheel (4) starts being driven, and stops the generation of the reference braking force on the drive wheel (4) at the time point corresponding to said estimated time point.

8. A control method for controlling travel of a straddle-type vehicle (100), the control method comprising:
controlling a braking force generated on at least one of wheels (3, 4) by a controller (60) such that a reference braking force is generated on a drive wheel (4) at a time point at which the drive wheel (4) starts being driven due to transmission of drive power output from a drive source (5) to the drive wheel (4) when a state where the braking force is generated on the at least one of the wheels (3, 4) of the straddle-type vehicle (100) is switched to a state where the drive wheel (4) is driven using the drive power output from the drive source (5) of the straddle-type vehicle (100) during adaptive cruise control in which the straddle-type vehicle (100) is made to travel according to a distance from said straddle-type vehicle (100) to a preceding vehicle, motion of said straddle-type vehicle (100), and a driver's instruction.

* * * * *